United States Patent [19]

Kelly, III et al.

[11] 4,101,818

[45] Jul. 18, 1978

[54] MULTI-CELL BATTERY CHARGER

[75] Inventors: William Tolson Kelly, III, Wilton, Conn.; Francis Stahl, Rocky River, Ohio

[73] Assignee: Union Carbide Corporation, New York, N.Y.

[21] Appl. No.: 781,995

[22] Filed: Mar. 28, 1977

[51] Int. Cl.² .......................................... H01M 10/46
[52] U.S. Cl. .......................................... 320/2; 320/3; 320/15
[58] Field of Search ........................................ 320/2–4, 320/15, 48; 429/9

[56] References Cited

U.S. PATENT DOCUMENTS

| 3,209,230 | 9/1965 | Mas | 320/2 |
|---|---|---|---|
| 3,307,096 | 2/1967 | Lyon | 320/15 |
| 3,391,321 | 7/1968 | Ota | 320/2 |
| 3,435,318 | 3/1969 | Mas | 320/2 UX |
| 3,579,075 | 5/1971 | Floyd | 320/48 X |

Primary Examiner—Robert J. Hickey
Attorney, Agent, or Firm—Cornelius F. O'Brien

[57] ABSTRACT

A multi-cell battery charger having a cell holder adapted for receiving and charging various size cylindrical cells, such as the "AA" size, the "C" size or the "D" size rechargeable cells.

11 Claims, 9 Drawing Figures

MULTI-CELL BATTERY CHARGER

FIELD OF THE INVENTION

The invention relates to a multi-cell battery charger having a battery holder adapted to accommodate for charging two "D" size cells, two "C" size cells, or two or four "AA" size cells.

BACKGROUND OF THE INVENTION

Rechargeable cells, such as the nickel-cadmium cells, have a relatively constant potential during discharge and can be recharged many times, thus extending their useful life. In general, any secondary or rechargeable cell contains a combination of active materials which can be electrolytically oxidized and reduced repeatedly. In rechargeable cells, reactions at both electrodes are reversible and the input of current in the appropriate direction from an outside source will reverse the discharge reaction and, in effect, recharge the electrodes.

The rechargeable cells have been used in various type devices, such as toys, calculators, radios and other types of power-operated devices. Many of the power-operated devices on the market today have been designed to accommodate cylindrical cells of the "AA", "C", and "D" size. These sizes have now become standard-type cell sizes having overall dimensions which can be found in various publications, such as The American National Standard Specifications For Dry Cell Batteries—ANSI C18.1-1969 published by the American National Standards Institute, Inc., New York, N. Y.

There are many different types of chargers on the market which employ standard transformer and half-wave or full-wave rectifier circuit means for providing a direct current for charging rechargeable type cells or batteries. The cell holders of the chargers are generally designed to accommodate a single size cell. Recently, cell holders have been designed which can accommodate two or more standard size cells through the use of adapters. For example, one cell holder is designed to accommodate "D" size cells and, in addition, comes equipped with a hollow "D" size shell into which a "C" size cell can be placed. The hollow shell is constructed such that the terminals of the "C" size cell are electronically contacted to terminals on the shell thereby providing the inner cell with an outer "D" size shell configuration. Thus the "C" size cell can be charged in the "D" size cell adapter.

One of the objects of this invention is to provide a multi-cell charger that does not require any adapter for charging "AA", "C" and "D" size rechargeable cells.

Another object of this invention is to provide a rechargeable cell holder that is constructed such that it can accommodate either "D" size, "C" size or "AA" size cell, but not combinations of these size cells at the same time.

Another object of this invention is to provide a rechargeable cell holder having a groove for accommodating a "D" size cell and when a "C" size or "AA" size cell is extended across the groove, the groove can be used to provide a pair of recesses disposed on both sides of the cell which can be utilized to facilitate gripping and removal of the cell from the holder.

Another object of this invention is to provide a rechargeable cell holder having a groove for accommodating a "C" size cell and a groove for accommodating an "AA" size cell and when a "D" size cell is extended across both of the grooves, each of the grooves can be used to provide a pair of recesses disposed on both sides of the "D" cell which can be utilized to facilitate gripping and removal of the cell from the holder.

SUMMARY OF THE INVENTION

The invention broadly relates to a battery charger comprising a holder having a generally rectangular base with a pair of upstanding first and second side walls, an upstanding front wall and an upstanding rear wall; a first conductive terminal contact means having a first flexible upstanding conductive terminal member disposed adjacent to and interior of the first side wall and a second flexible upstanding conductive terminal member disposed adjacent to and interior of the rear wall; a second conductive terminal contact means having a first flexible upstanding conductive terminal member disposed adjacent to and interior of the second side wall and a second flexible upstanding conductive terminal member disposed adjacent to and interior of the rear wall; a third conductive terminal contact means having a flexible upstanding conductive terminal member disposed adjacent to and interior of the front wall; said second conductive terminal member of the first conductive terminal contact means and said second conductive terminal member of the second conductive terminal contact means aligned substantially in the same plane and spaced apart from the conductive terminal member of the third terminal contact means by a lengthwise distance to accommodate a "D" size [about 2.25 inches (5.7 cm)] rechargeable cell in pressure contact therebetween; said first conductive terminal member of the first conductive terminal contact means disposed and spaced apart from said first conductive terminal member of the second conductive terminal contact means by a distance to accommodate two tandem series-connected "AA" size or "C" size [about 1.8 inches (4.8 cm)] rechargeable cells in pressure contact therebetween; said first conductive terminal contact means and said second conductive terminal means contact connected across a transformer and current rectifier adapted for plugging into a conventional alternating-current power supply line.

The base of the battery charger could be provided with upstanding projected members to define a pair of traverse grooves to accommodate two parallel aligned "D" size rechargeable cells, the first traverse groove being disposed proximal to and in parallel alignment with the first side wall and the second groove being disposed proximal to and in parallel alignment with the second side wall; a pair of longitudinal grooves to accommodate two tandem series-connected "AA" size cells, the first longitudinal groove being disposed proximal to and in parallel alignment with the front wall and the second longitudinal groove being disposed proximal to and in parallel alignment with the rear wall; and an axially disposed longitudinal groove to accommodate two tandem series-connected "C" size rechargeable cells.

In the charging of a pair of "AA" size cells, it is preferable to have a resistive element, such as a 12 ohm resistor in series with the cells so as to limit the charging current fed to the cells. Thus a rectified power source could provide a fixed current for charging "C" and "D" size cells while the inclusion of a resistive element in series with the "AA" size cells could effectively decrease the charging current for these small capacity cells.

The battery charger of this invention will become apparent from the following description in conjunction with the accompanying drawing which is set forth as being exemplary of an embodiment of the present invention wherein.

DETAILED DESCRIPTION OF THE DRAWING

Figure 1:
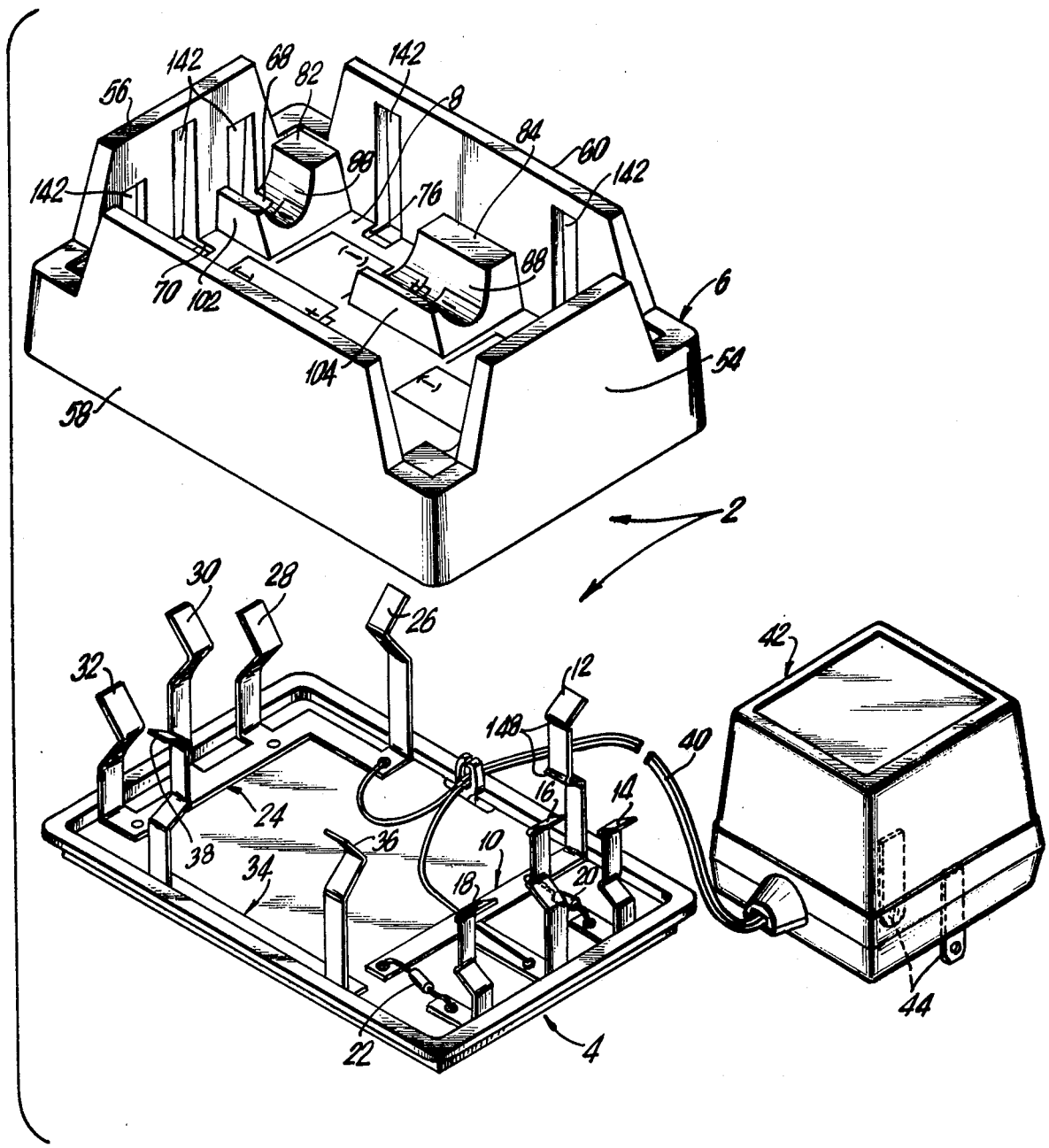
FIG. 1 is an exploded perspective view of the battery holder coupled to a plug-in rectifier means in accordance with the present invention.
Figure 7:
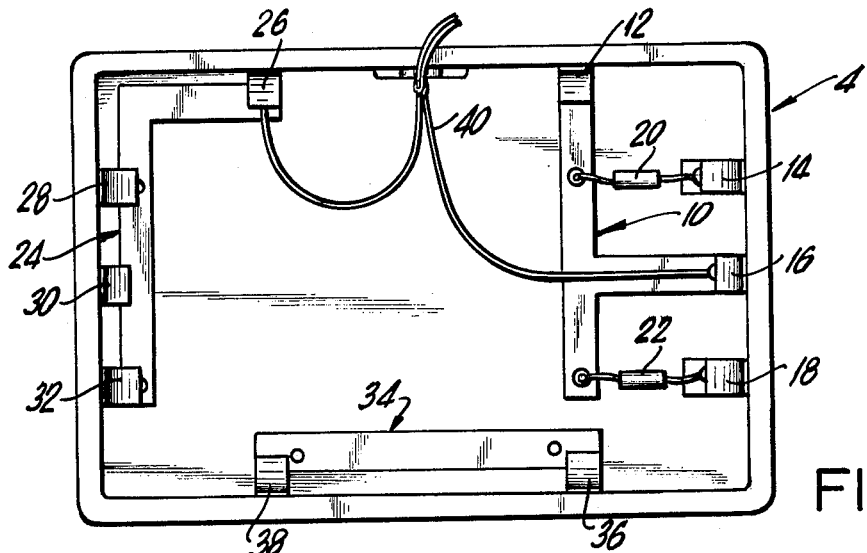
FIG. 7 is a plan view of the lower base of the battery holder of FIG. 1 showing the terminal contact means.

In FIG. 1 there is shown a battery holder 2 comprising a sub-base member 4 and housing 6, said sub-base member 4 designed to seat fixedly onto a flange on the upper base 8 of housing 6. Secured to the sub-base member 4 as shown in FIGS. 1 and 7 is a first terminal contact 10 having an upstanding flexible terminal member 12 disposed proximal the rear edge and terminal members 14, 16 and 18 disposed proximal the side edge. Terminal members 14 and 18 are not electronically connected directly to terminal contact 10 but, instead, each is connected to terminal contact 10 via a current limiting resistor 20 and 22, respectively. A second terminal contact 24 is secured to the sub-base 4 and has an upstanding flexible terminal member 26 disposed proximal the rear edge, and upstanding flexible terminal members 28, 30, 32 disposed proximal the opposite side edge. A third terminal contact 34 is secured to the sub-base 4 and has upstanding flexible terminal members 36 and 38 disposed proximal the front edge. The terminal contacts 10, 24 and 34 could be made of any suitable conductive spring material, such as nickel-plated spring brass, nickel-plated copper, tin-plated copper, cadmium-plated copper, etc.

Figures 8, 9:
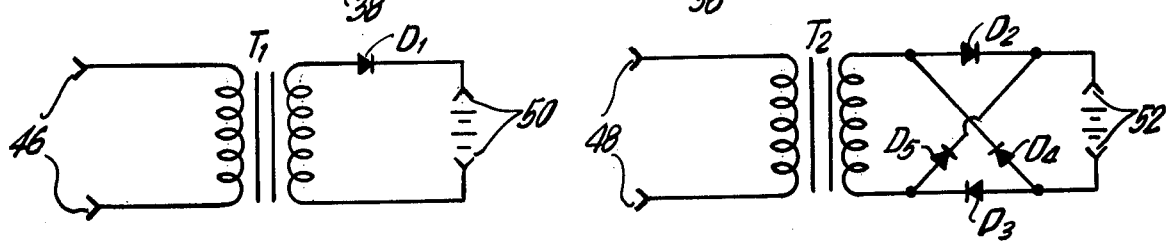
FIG. 8 is a schematic view of a transformer and half-wave rectifier which can be used in this invention.
FIG. 9 is a schematic view of a transformer and full-wave rectifier which can be used in this invention.

Terminal contacts 10 and 24 are electronically connected via wire 40 across a conventional type rectifier 42 which is adapted through male plug 44 for coupling to a conventional alternating current power source. The rectifier could comprise a transformer $T_1$ coupled to a half-wave rectifier $D_1$ as shown in FIG. 8 or a transformer $T_1$ coupled to a full-wave bridge $D_2$ to $D_5$ rectifier as shown in FIG. 9. The terminals 46 and 48 of FIGS. 8 and 9, respectively, would correspond to the terminals of plug 44 shown in FIG. 1. The terminals 50 and 52 of FIGS. 8 and 9, respectively, would correspond to terminal contacts 10 and 24 shown in FIG. 1.

Housing 6 shown in FIGS. 1 through 6 comprises an upper base 8 having upstanding terminal support side walls 54 and 56, an upstanding terminal support front wall 58, and an upstanding terminal support rear wall 60. In the upper base 8 proximal the first side wall 54 are disposed three openings 62, 64 and 66 which are spaced apart so as to accommodate the upstanding terminal members 14, 16 and 18, respectively, when the sub-base 4 is fixedly seated onto the flange of the underside of upper base 8. In a like manner, the upper base 8 has openings 68, 70 and 72 proximal the second side wall 56 to accommodate terminal members 28, 30 and 32, respectively; openings 74 and 76 proximal the rear wall 60 to accommodate terminal members 12 and 26, respectively; and openings 78 and 80 proximal the first wall 58 to accommodate terminal members 36 and 38, respectively. The upstanding conductive terminal member could be further defined as being resilient biased members.

Figure 2:
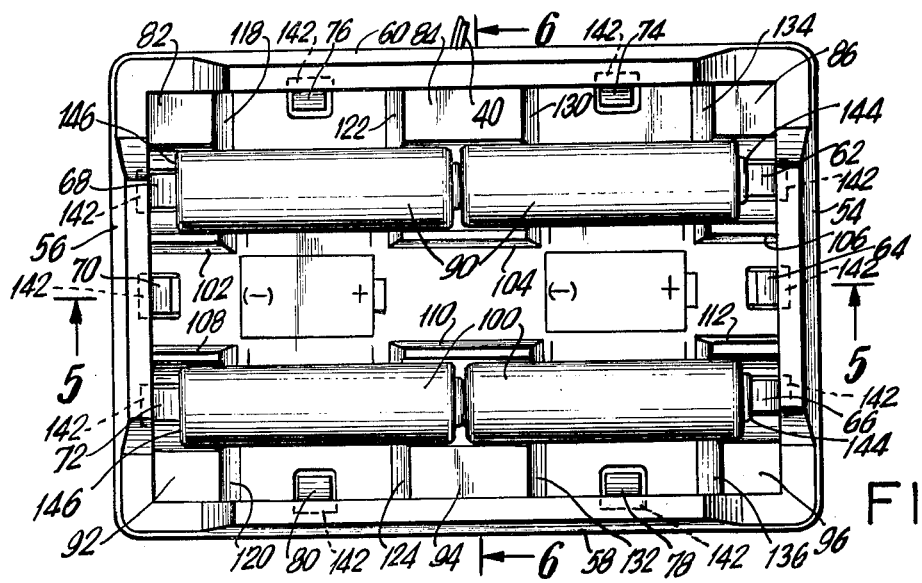
FIG. 2 is a plan view of the battery holder of FIG. 1 showing two pairs of series connected "AA" size rechargeable cells in position for receiving a charge.

Three spaced apart and axially aligned blocks 82, 84 and 86, each having a cylindrical recess, project from upper base 8 proximal the rear wall 60. The longitudinal groove 88 formed by the cylindrical recesses in members 82, 84 and 86 defines a trough or recess for accommodating two tandem series-connected "AA" size cells 90 as shown in FIG. 2. In a like manner, spaced apart and aligned blocks 92, 94 and 96, each having a cylindrical recess, project from upper base 8 proximal the first wall 58 to form a longitudinal groove 98 for accommodating two tandem series-connected "AA" size cells 100 (FIGS. 2 and 6).

Figure 3:
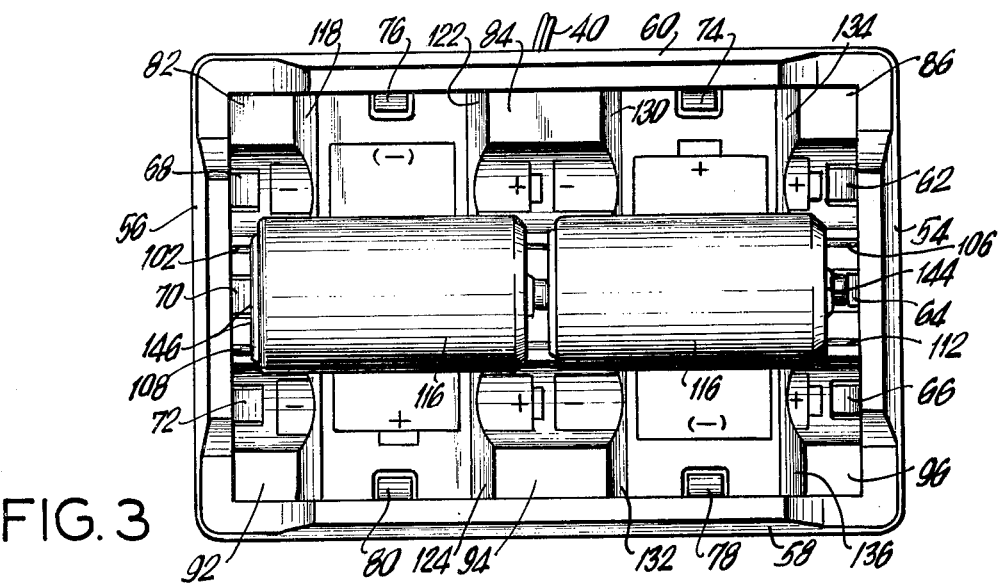
FIG. 3 is a plan view of the battery holder of FIG. 1 showing a pair of series connection "C" size rechargeable cells in position for receiving a charge.
Figure 6:
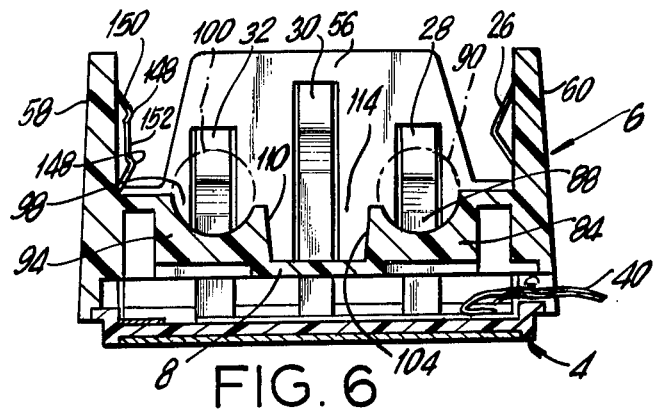
FIG. 6 is a transverse cross-sectional view of FIG. 2 taken along line 6—6.

The three aligned block members 82, 84 and 86 are transversely spaced from the three aligned block members 92, 94 and 96 so that their inner upstanding wall members 102, 104, 106, 108, 110 and 112, respectively, which are smaller in height than the opposite wall members defining longitudinal grooves 88 and 98, define a center longitudinal groove or cavity 114 to accommodate two tandem series-connected "C" size cells 116 as shown in FIGS. 3 and 6. The "C" size cells need not seat within longitudinal groove 114 completely so that they touch upper base 8 but, instead, the cells could rest on wall members 102, 104, 106, 108, 110 and 112 such that a portion of each of their outer extremities would extend into groove 114. An advantage in having the "C" size cells resting on the closely-spaced wall members is that the "C" cells could then overlap and project onto the space allotted for the "AA" size cells thereby preventing the simultaneous of both the "C" size and "AA" size cells into the holder.

Figure 5:
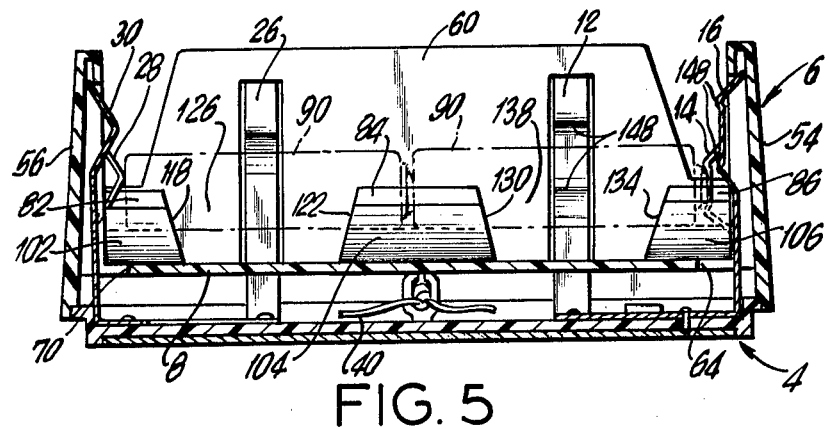
FIG. 5 is a longitudinal cross-sectional view of FIG. 2 taken along line 5—5.

As shown in FIGS. 1 and 5, terminal members 16 and 30 are positioned higher from the upper base 8 than terminal members 14, 18, 28 and 32 to insure that when two tandem series-connected "AA" size cells are placed into groove 114, they will be disposed below terminal members 16 and 30, thus preventing contact with the terminal members 16 and 30. This will insure that the "AA" size cells will only be charged when disposed in grooves 88 and 98, said grooves containing terminal members 14 and 18, respectively, which are connected to limiting resistors 20 and 22, respectively. Thus this will provide a fail-safe feature whereby the current for charging the "AA" size cells will be reduced by the current limiting resistors 20 and 22 as described above.

Figure 4:
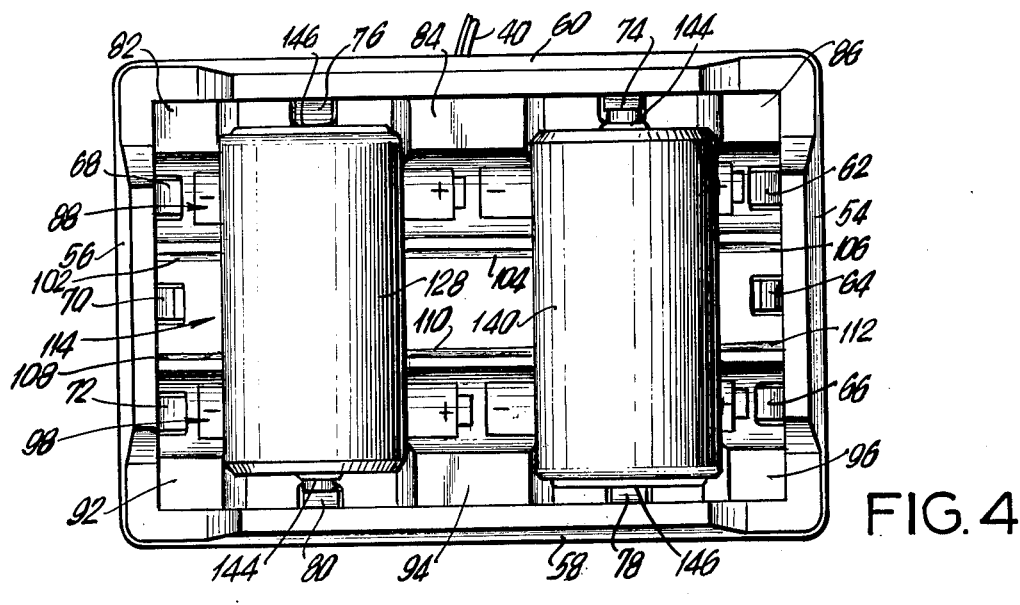
FIG. 4 is a plan view of the battery holder of FIG. 1 showing two "D" size rechargeable cells in position for receiving a charge.

Each of the block members 82 and 92 has a tapered wall 118 and 120, respectively, which is spaced apart from the tapered walls 122 and 124 of block members 84 and 94, respectively, to define a first transverse groove 126 for accommodating a first "D" size cell 128 as shown in FIGS. 4 and 5. In a similar manner, the opposite tapered walls 130 and 132 of block members 84 and 94, respectively, are spaced apart from tapered walls 134 and 136, respectively, to define a second transverse groove 138 for accommodating a second "D" size cell 140. As is apparent from FIG. 4, when the "D" size cells 128 and 140 are placed into the charge holder, they overlap grooves 88, 98 and 114, thereby preventing the insertion of the "AA" size and "C" size cells when the "D" cells are being charged.

Another feature of the present invention is that when the "AA" size or "C" size cells are being charged, grooves 126 and 138 (FIG. 5) provide recesses on both sides at the midsection of the "AA" size or "C" size cells (FIGS. 2 and 3) which can be used to facilitate the grasping and removal of the cells from the charger. In a similar manner, when "D" size cells are assembled in the battery charger, groove 114 provides recesses on both sides at the midsection of the "D" size cells which can be used to facilitate the grasping and removal of said "D" size cells.

As shown in FIG. 1, the internal walls 54, 56, 58 and 60 of holder 6 can be fabricated with grooves or cavities 142 disposed adjacent the openings 62–80 in upper base 8. Each groove 142 is dimensionally sized to accommodate and provide support for the respective upstanding resilient biased terminal members of terminal contacts 10, 24 and 34. The "AA" size cylindrical cell [1⅞ inches long (4.74 cm) by 17/32 inch diameter [1.35 cm)], the "C" size cylindrical cell [1 13/16 inches long (4.6 cm) by 15/16 inch diameter (2.38 cm)] and the "D" size cylindrical cell [2¼ inches long (5.7 cm) by 1¼ inches diameter (3.17 cm)] all are fabricated with a projected center-disposed positive terminal 144 and a flat disc-shaped negative terminal 146 as shown in FIGS. 2 through 4. Consequently, the upstanding terminals 26, 28, 30, 32 and 36, which are the negative terminals of the charger, are "V" shaped so as to insure pressure contact with the disc-shaped negative terminals 146 of the cells. The remaining upstanding terminals 12, 14, 16, 18 and 38, which are the positive terminals of the charger, are shaped somewhat in a flattened "U"-shaped configuration with two projected members 148 (FIGS. 5 and 6) disposed at the junction of the leg 150 and base 152 of the terminal so as to insure pressure contact with the positive center terminal 144 of the cells.

Holder 6 of the charger could be molded or otherwise fabricated using a suitable plastic material, such as polyolefin, polyethylene, polypropylene, copolymers of acrylonitrile, butadiene or styrene, or any other suitable material capable of supporting the cells to be charged and withstanding normal handling and use without breaking.

Although upstanding terminals 12, 14, 16, 18 and 38 are shown in the form of a flattened U-shaped configuration, they could be formed into a V-shaped configuration and the corresponding opposite-disposed terminals 36, 28, 30, 32 and 26, respectively, could be formed into a flattened U-shaped configuration. This terminal member change would require the cells to be inserted into the holder in the reverse of that shown in the drawing. In addition, resistors 20 and 22 could be connected in series between terminal members 28 and 32, respectively, and terminal contact means 24. In this embodiment, the resistors would function as discussed above in conjunction with the charging of "AA" size cells.

Alternative embodiments and modes of practicing the invention, but within its spirit and scope, will, in the light of this disclosure, occur to persons skilled in the art. It is intended, therefore, that this description be taken as illustrative only and not be construed in any limiting sense.

What is claimed is:

1. A battery charger comprising a holder having a generally rectangular base with a pair of upstanding first and second side walls, an upstanding front wall and an upstanding rear wall; a first conductive terminal contact means having a first flexible upstanding conductive terminal member disposed adjacent to and interior of the first side wall and a second flexible upstanding conductive terminal member disposed adjacent to and interior of the rear wall; a second conductive terminal contact means having a first flexible upstanding conductive terminal member disposed adjacent to and interior of the second side wall and a second flexible upstanding conductive terminal member disposed adjacent to and interior of the rear wall; a third conductive terminal contact means having a flexible upstanding conductive terminal member disposed adjacent to and interior of the front wall; said second conductive terminal member of the first conductive terminal contact means and said second terminal member of the second conductive terminal contact means aligned substantially in the same plane and spaced apart from the conductive terminal member of the third terminal contact means by a distance to accommodate lengthwise a "D" size [about 2.25 inches (5.7 cm)] rechargeable cell in pressure contact therebetween; said first conductive terminal member of the first conductive terminal contact means disposed and spaced apart from said first conductive terminal member of the second conductive terminal contact means by a distance to accommodate two tandem series-connected "AA" size or "C" size [about 1.8 inches (4.8 cm)] rechargeable cells in pressure contact therebetween; said first conductive terminal contact means and said second conductive terminal contact means connected across a transformer and current rectifier adapted for plugging into a conventional alternating-current power supply line.

2. The battery charger of claim 1 wherein the base is provided with upstanding projected members to define a pair of transverse grooves to accommodate two parallelly aligned "D" rechargeable cells, the first transverse groove being disposed proximal to and in parallel alignment with the first side wall and the second groove being disposed proximal to and in parallel alignment with the second side wall; a pair of longitudinal grooves to accommodate two tandem series-connected "AA" size cells, the first longitudinal groove being disposed proximal to and in parallel alignment with the front wall and the second longitudinal groove being disposed proximal to and in parallel alignment with the rear wall; and an axially disposed longitudinal groove to accommodate two tandem series-connected "C" size rechargeable cells.

3. The battery charger of claim 2 wherein each of the longitudinal grooves is defined by three axially spaced-apart members having substantially cylindrical recesses to accommodate the width of an "AA" size cell, the first member being spaced apart from the second member by a distance sufficient to accommodate the width of a "D" size cell therebetween, and the second member being axially spaced apart from the third member by a distance sufficient to accommodate the width of a "D" size cell therebetween; and wherein the inner walls of said members proximal the longitudinal center axis of the holder are spaced apart sufficiently to define the axially disposed longitudinal groove.

4. The battery charger of claim 2 wherein the first upstanding conductive terminal member of the first conductive terminal contact means comprises three separate upstanding terminals, each of which is aligned at one end of one of the longitudinal grooves; wherein the first upstanding conductive terminal member of the second conductive terminal contact means comprises three separate upstanding terminals, each of which is aligned at the opposite end of one of the longitudinal grooves; wherein the upstanding conductive terminal member of the third conductive terminal contact means comprises two separate upstanding terminals, each of which is aligned at one end of one of the transverse grooves; wherein the second upstanding conductive terminal member of the first conductive terminal contact means is aligned at the opposite end of one of the transverse grooves; and wherein the second upstanding conductive terminal member of the second conductive terminal contact means is aligned at the opposite end of the other transverse groove.

5. The battery charger of claim 4 wherein the upstanding conductive terminal members of the first conductive terminal contact means are in the form of a flattened U-shaped configuration; wherein the upstanding conductive terminal members of the second conductive terminal contact means are in the form of a V-shaped configuration; wherein the upstanding conductive terminal member of the third conductive contact means aligned with a transverse groove which has a flattened U-shaped terminal member aligned at its opposite end is in the form of a V-shaped configuration; and wherein the other upstanding conductive terminal member of the third conductive contact means aligned with a transverse groove which has a V-shaped terminal member aligned at its opposite end is in the form of a flattened U-shaped configuration.

6. The battery charger of claim 4 wherein the upstanding conductive terminal members of the first conductive terminal contact means are in the form of a V-shaped configuration; wherein the upstanding conductive terminal members of the second conductive terminal contact means are in the form of a flattened U-shaped configuration; wherein the upstanding conductive terminal member of the third conductive contact means aligned with a transverse groove which has a flattened U-shaped terminal member aligned at its opposite end is in the form of a V-shaped configuration; and wherein the other upstanding conductive terminal member of the third conductive contact means aligned with a transverse groove which has a V-shaped terminal aligned at its opposite end is in the form of a flattened U-shaped configuration.

7. The battery charger of claim 4 wherein a first resistive element is connected in series between the first conductive terminal contact means and the upstanding terminal member of said first conductive terminal contact means disposed in alignment with one of the pair of longitudinal grooves, and a second resistive element is connected in series between the first conductive terminal contact means and the upstanding terminal member of said first conductive terminal contact means disposed in alignment with the other of the pair of longitudinal grooves.

8. The battery charger of claim 3 wherein a first resistive element is connected in series between the second conductive terminal contact means and the upstanding terminal member of said second conductive terminal contact means disposed in alignment with one of the pair of longitudinal grooves, and a second resistive element is connected in series between the second conductive terminal contact means and the upstanding terminal member of said second conductive terminal contact means disposed in alignment with the other of the pair of longitudinal grooves.

9. The battery charger of claim 4 wherein the upstanding walls of the holder have grooves to accommodate the upstanding terminal members of the first, second and third conductive terminal contact means.

10. The battery charger of claim 4 wherein the first, second and third terminal contact means are secured to a sub-base with their respective upstanding terminal members extending therefrom; and wherein the base of the holder has a plurality of openings aligned with the upstanding terminal members such that the upstanding terminal members pass through said opening and become aligned with their respective grooves.

11. The battery charger of claim 10 wherein the upstanding walls of the holders have grooves to accommodate the upstanding terminal members of the first, second and third conductive terminal contact means.

* * * * *